Feb. 13 1951 B. S. TROTT 2,541,446

IMAGE DISTORTION CORRECTOR FOR CATHODE-RAY TUBES

Filed Jan. 4, 1949

INVENTOR.
BARNET S. TROTT
BY
Laforest S. Saulsbury
ATTORNEY

Patented Feb. 13, 1951

2,541,446

UNITED STATES PATENT OFFICE 2,541,446

IMAGE DISTORTION CORRECTOR FOR CATHODE-RAY TUBES

Barnet S. Trott, Kew Gardens, N. Y.

Application January 4, 1949, Serial No. 69,111

4 Claims. (Cl. 250—156)

The present invention relates to devices for the correction of distortion of images projected upon the screen of a cathode ray tube, as in a television receiver.

An object of the invention is to provide a simple and inexpensive means for the correction of distortions which appear in projected cathode ray images, the means for obtaining such correction consisting of one or more permanent magnets disposed in proximity to the cathode ray electron stream.

Another object of the present invention is to provide simple and inexpensive electron-stream affecting means for the correction of distortions which appear in projected cathode ray images formed by said stream with such means being disposed adjacent said stream as desired.

Another object of the present invention is to provide electron-stream affecting means for the correction of electron stream image distortion, said means being suitably constructed and positioned in accordance with the amount and type of distortion.

A further object of the invention is the provision of an adjustable mounting for the permanent magnets which will permit them to be positioned as desired to obtain the required correction, together with locking means for retaining them in any desired position of adjustment.

In many instances, as in the case of a television receiver, economies in construction of the receiving apparatus may be effected which would be desirable except for the fact that they produce non-linearities which result in bulge distortion of the received image. The present invention contemplates the correction of such distortion with greater economy than would be obtained by eliminating these non-linearities directly in the circuits of the receiving apparatus. The invention also is applicable to the correction of distortions of the type produced by interfering disturbances such as stray affecting fields from power transformers or similar apparatus connected to the power supply circuits which energize the cathode ray tube.

Other and further objects will become apparent upon reading the following specification together with the accompanying drawing forming a part hereof.

Referring to the drawings.

Figures 1, 2, 3, 4:
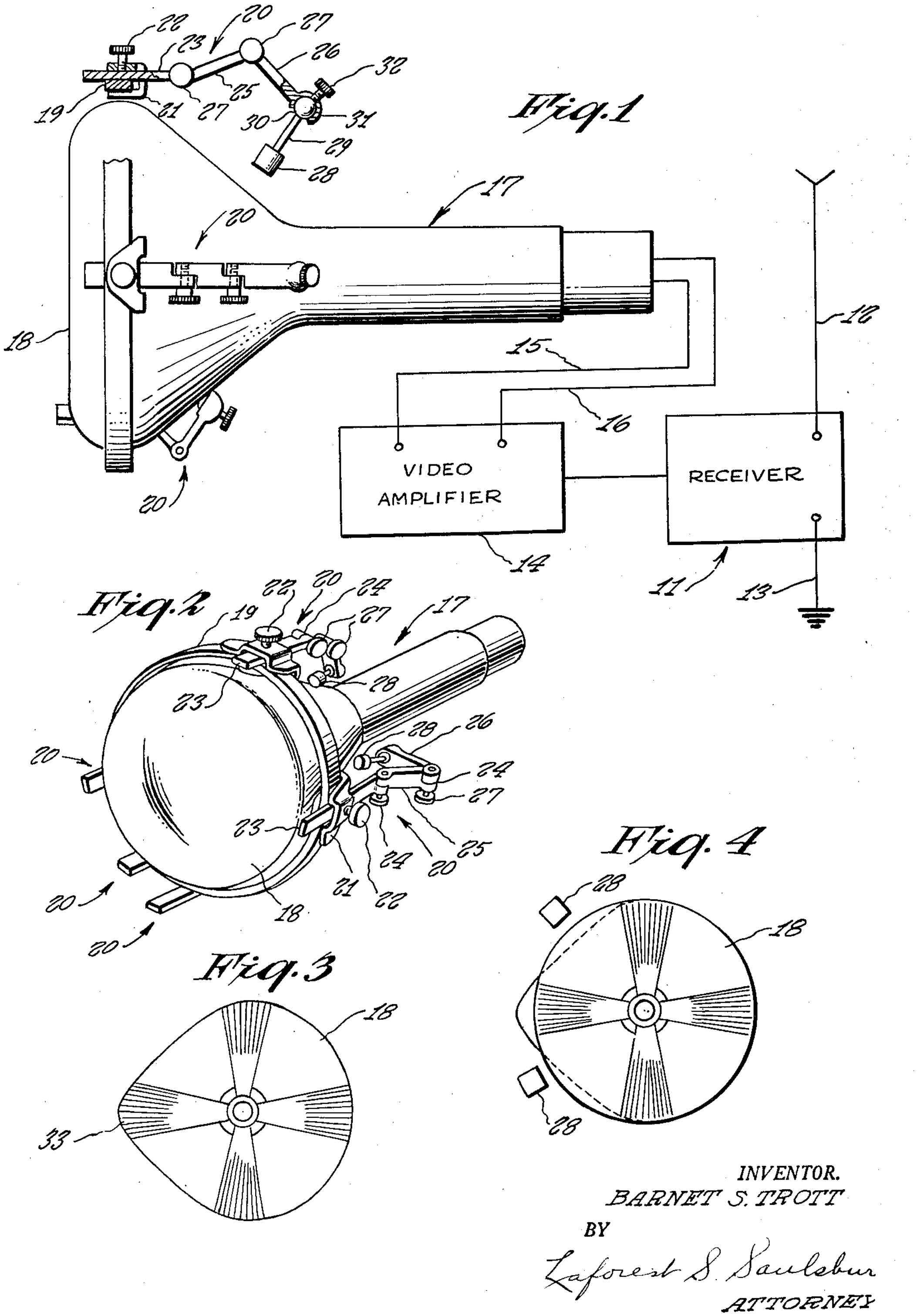
Fig. 1 is a diagrammatic representation of a television receiver showing a side view, partly broken away, of a cathode ray tube embodying the invention.
Fig. 2 is a perspective view of the cathode ray tube shown in Fig. 1.
Fig. 3 shows a typical test pattern as projected on the cathode ray tube illustrating a form of bulge or a linear distortion which may be corrected by the invention.
Fig. 4 shows the test pattern of Fig. 3 illustrating correction of the distortion.

Referring to Fig. 1, a television receiver is shown diagrammatically as comprising a principal receiver portion designated generally as 11 connected to an antenna 12 and a ground 13. Output currents from receiver portion 11 are applied to a video amplifier 14. Amplified picture signals from video amplifier 14 are carried by one or more conductors indicated diagrammatically as 15 and 16 to a cathode ray tube of any desired type designated generally as 17. Cathode ray tube 17 is of conventional construction in all respects and the details of its construction have been omitted to simplify the description of the invention. It comprises the usual means for producing an electron stream (not shown), a suitable fluorescent screen 18 for viewing the image, and conventional means for focussing the electron stream controlling its intensity in accordance with the video signals from amplifier 14, and deflecting the same all of which are well known in the art and which are therefore not specifically illustrated. The receiver 11 and amplifier 14 also include the usual vertical and horizontal sweep circuits for controlling the deflection of the electron stream of cathode ray tube 17 in accordance with the incoming picture signals in order that the received image may be properly reproduced.

Non-linearities may be present in the sweep circuits, in the video amplifier 14, or in other circuits which directly affect the reproduction of the received image. Such non-linearities may be removed in the usual way by changes in the circuits to obtain accurate and precise electrical characteristics. In general, it will be found that such changes are expensive and time consuming, and that they do not necessarily remain permanently effective because of drifting of the characteristics in the course of time. Such drift may be occasioned by aging of tubes, or of resistive or reactive circuit elements included in the various circuits.

Such distortion may be readily corrected, however, by the use of one or more small permanent magnets adjustably disposed in proximity to the cathode ray tube and sufficiently close thereto to produce a permanent magnetic field which will modify or affect the normal action of the electron stream.

In Fig. 2, there is shown by way of illustration, a peripheral supporting ring 19 which encircles the cathode ray tube 17 in proximity to screen 18. Ring 19 is shown supporting a plurality of adjustable magnet supports 20 each of which comprises a clamp member 21 provided with a knurled clamping screw 22. Upon loosening screw 22, clamp member 21 may be moved to any desired position around peripheral supporting ring 19 and horizontal member 23 may be moved as desired transversely of ring 19 to effect positioning of magnet support 20 axially with respect to cathode ray tube 17.

Further individual adjustment of the position of each of the magnet supports is provided by the hinged joints 24 which interconnect members 23, 25 and 26. The joints may be locked in any desired position as by knurled clamping screws 27. A small permanent magnet 28 is shown supported at the end of a member 29, the other end of member 29 terminating in a ball 30. Ball 30 is freely movably supported in a socket 31 at one end of member 26 and may be clamped in any desired position of adjustment by knurled screw 32. It will thus be seen, that each of the magnet supports provides for positioning of each of the permanent magnets in virtually any desired position with respect to cathode ray tube 17, and retaining the magnet fixedly so positioned. The ball and socket joint 30—31 constitutes, together with the other adjustable members 23, 25 and 26, a universal adjustment which permits the direction of orientation of the magnetic axis of each magnet 28 to be changed independently of the position of the magnet.

It may be desirable to magnetize each cylindrical magnet so that its axis of magnetization is transverse with respect to the longitudinal axis of the cylinder. In other instances, it may be desirable to magnetize each of the magnets 28 along some other convenient axis of magnetization. Magnets of other shapes may also be used. The principal consideration is to provide a wide range of adjustability in position of the magnet as well as independent adjustability in the direction of orientation of its axis of magnetization.

Fig. 3 illustrates a test pattern of the type commonly transmitted by television transmitters in order that the quality of reception of the image may be conveniently checked. It will be seen that the test pattern is distorted, being enlarged or bulged leftwardly of its center as at 33. Fig. 4 shows two magnets 28 positioned at the left side of screen 18, adjusted to push the picture in toward the right. The correction thus obtained results in a substantially circular and undistorted reproduction of the test pattern. Other positions of the correcting magnets may be used to compensate for other forms of distortion, and a greater number of magnets may be used where the nature of the distortion is of a more complex character than that illustrated in Fig. 3.

I have shown what I believe to be the best embodiment of my invention. I do not wish, however, to be confined to the embodiment shown but what I desire to cover by Letters Patent is set forth in the appended claims.

I claim:

1. In a television apparatus; a cathode ray tube having a cathode for producing an electron stream and a fluorescent screen for viewing an image produced thereon by the electron stream; deflecting means for moving the electron stream and controlling its instantaneous intensity to produce the image and having inherent characteristics which produce distortion of the image; distortion correction means comprising a permanent magnet positioned in proximity to the cathode ray tube and movable in all directions with respect thereto, including universal adjustment means for independently changing the direction of orientation of the magnetic axis of the magnet; and locking means for retaining the magnet in any desired position of adjustment.

2. In a television apparatus; a cathode ray tube having a cathode for producing an electron stream and a fluorescent screen for viewing an image produced thereon by the electron stream; deflecting means for moving the electron stream and controlling its instantaneous intensity to produce the image and having inherent characteristics which produce distortion of the image; and distortion correction means comprising a plurality of permanent magnets positioned in proximity to the cathode ray tube and each movable in all directions with respect thereto, including individual universal adjustment means for independently changing the direction of orientation of the magnetic axis of each magnet whereby the plurality of magnets will correct collectively for substantially all of the distortion.

3. A television apparatus as in claim 2 further comprising individual locking means for each magnet for retaining the magnet in any desired position of adjustment.

4. In combination, a cathode ray tube for a television receiver, said cathode ray tube having a cathode for producing an electron stream, a fluorescent screen, means for deflecting said electron stream for producing an image on said screen, a peripheral supporting ring mounted in proximity to said cathode ray tube substantially encircling said fluorescent screen, a plurality of supports adjustably secured to said ring at spaced points thereon, said supports comprising clamps and members adjustable longitudinally of said tube, said members having secured thereto elements adjustable transversely of the axis of said screen, and permanent magnet means supported on said elements, whereby said permanent magnet means is movable in all directions with respect to said tube.

BARNET S. TROTT.

REFERENCES CITED

The following references are of record in the file of this patent:

UNITED STATES PATENTS

| Number | Name | Date |
| --- | --- | --- |
| 2,157,182 | Maloff | May 9, 1939 |
| 2,177,688 | Cawein | Oct. 31, 1939 |
| 2,212,206 | Holst et al. | Aug. 20, 1940 |
| 2,258,643 | De Gier et al. | Oct. 14, 1941 |
| 2,442,975 | Grundmann | June 8, 1948 |
| 2,455,977 | Bocciarelli | Dec. 14, 1948 |
| 2,459,732 | Bradley | Jan. 18, 1949 |
| 2,494,459 | Torsch | Jan. 10, 1950 |
| 2,500,623 | Babbs | Mar. 14, 1950 |